United States Patent
Miyai

(10) Patent No.: US 9,030,686 B2
(45) Date of Patent: May 12, 2015

(54) DISPLAY DEVICE, IMAGE FORMING APPARATUS, AND METHOD OF CONTROLLING A DISPLAY DEVICE

(71) Applicant: KYOCERA Document Solutions Inc., Osaka (JP)

(72) Inventor: Toshiya Miyai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/081,016

(22) Filed: Nov. 15, 2013

(65) Prior Publication Data

US 2014/0139874 A1     May 22, 2014

(30) Foreign Application Priority Data

Nov. 16, 2012   (JP) ................................. 2012-252437

(51) Int. Cl.
*H04N 1/00* (2006.01)
*H04N 1/32* (2006.01)

(52) U.S. Cl.
CPC ....... *H04N 1/00408* (2013.01); *H04N 1/32101* (2013.01); *H04N 2201/0094* (2013.01); *H04N 2201/3215* (2013.01); *H04N 2201/3274* (2013.01)

(58) Field of Classification Search
USPC ............... 358/1.13, 1.15, 1.16; 715/700, 730, 715/763, 808; 399/81; 709/206
See application file for complete search history.

(56) References Cited

U.S. PATENT DOCUMENTS

| 2002/0046217 | A1 | 4/2002 | Kanazawa | |
|---|---|---|---|---|
| 2002/0196485 | A1* | 12/2002 | Mizoguchi et al. | 358/537 |
| 2009/0293020 | A1* | 11/2009 | Nakai et al. | 715/838 |
| 2013/0282836 | A1* | 10/2013 | DeLuca et al. | 709/206 |
| 2013/0305293 | A1 | 11/2013 | Watanabe et al. | |

FOREIGN PATENT DOCUMENTS

| JP | 2002-067452 A | 3/2002 |
|---|---|---|
| JP | 2002-268982 A | 9/2002 |
| JP | 2011-170704 A | 9/2011 |
| JP | 2012-157064 A | 8/2012 |

OTHER PUBLICATIONS

English language abstract and machine translation of JP 2002-268982, published Sep. 20, 2002.
English language abstract and machine translation for JP2011-170704A, published Sep. 1, 2011.
English language abstract for JP2012-157064A, published Aug. 16, 2012.
English language abstract for JP2002-067452A, published Mar. 5, 2002.

* cited by examiner

*Primary Examiner* — Vu B Hang
(74) *Attorney, Agent, or Firm* — NDQ&M Watchstone LLP

(57) ABSTRACT

A display device has a registration portion which accepts input of a message created by a user, a storage portion which stores the message inputted via the registration portion, a determination portion which extracts information on a display period of the message from the content of the message and which determines, based on the extracted information, an end time of display of the message, a time counting portion which counts time, and a display portion which displays the message stored in the storage portion until the end time determined by the determination portion.

13 Claims, 7 Drawing Sheets

DISPLAY DEVICE, IMAGE FORMING APPARATUS, AND METHOD OF CONTROLLING A DISPLAY DEVICE

INCORPORATION BY REFERENCE

This application is based upon and claims the benefit of priority from the corresponding Japanese Patent Application No. 2012-252437 filed on Nov. 16, 2012, the entire contents of which are incorporated herein by reference.

BACKGROUND

The present disclosure relates to a display device that displays messages, and to an image forming apparatus provided with such a display device.

Some display devices are designed to allow display of information (messages) arbitrarily created and prepared by users. Moreover, with respect to arbitrarily created messages, display times are often settable so that a given message is displayed at a specified time. Public information display systems are known that display messages at specified times.

One specific known example is a system that displays an advertisement message for about ten seconds starting with a specified time. This public information display system is provided with a means for receiving a message from a user across a communication network, a means for storing the received message, and a means for displaying the stored message on a display portion of a public information display device that is installed on the street or at a station to provide advertisements and guides. This eliminates the need for the person who intends to deliver the message to go to the specific place, making it possible to readily deliver the message which he intends to convey to an individual or people at large.

Various electric and electronic appliances are often equipped with a display device. For example, such display devices display screens for input of settings of, or for operation of, appliances. Some such display devices display messages indicating the condition of appliances, such as error messages and trouble codes for dealing with errors.

Some display devices display not only messages indicating the condition of appliances and the like but even arbitrary (desired) messages created by users. In such a case, a user performs operations to enter and create a note on use, a notice to other users, or the like as a message and to display it on a display device. The thus created and set notice or the like is displayed as a message in the form of an electronic sticky note on the display device.

Here, conventionally, to specify the display time of a message, it is necessary, in addition to creating the message, to set the display period of the message, that is, from when to when to display the message. This may require, in addition to creation of a message, exact setting of a display period, complicating the operations for creating and registering a message. This is inconvenient. Moreover, if a user makes a wrong setting or registration with respect to the display period of a message, the message cannot be displayed at a proper time (a mistake on the part of the creator of a message leads to failure to make an effective announcement). This too is inconvenient.

Incidentally, the known technology mentioned above is directed to advertising, and accordingly the display period of a message is extremely short. Thus, the technology cannot be applied to display of a message for a given period in the form of an electronic sticky note. Moreover, with the known technology mentioned above, only the start time of display of a message can be specified, and no display period can be set. Thus, the technology does not provide a solution to the inconveniences discussed above.

SUMMARY

In view of the foregoing, according to the present disclosure, a display device includes a registration portion which accepts input of a message created by a user, a storage portion which stores the message inputted via the registration portion, a determination portion which extracts information on a display period of the message from the content of the message and which determines, based on the extracted information, an end time of display of the message, a time counting portion which counts time, and a display portion which displays the message stored in the storage portion until the end time determined by the determination portion.

Further features and advantages of the present disclosure will become apparent from the description of embodiments given below.

DETAILED DESCRIPTION

Hereinafter, with reference to FIGS. 1 to 9, an embodiment of the present disclosure will be described. The following description takes, as an example, a multifunction peripheral 100 (corresponding to an image forming apparatus) that includes an operation panel 1 (corresponding to a display device). It should however be understood that any specific features in terms of structure, arrangement, etc. mentioned in connection with the embodiment are simply illustrative and are not meant to limit the scope of the disclosure in any way.

(Outline of an Image Forming Apparatus)

Figure 1:
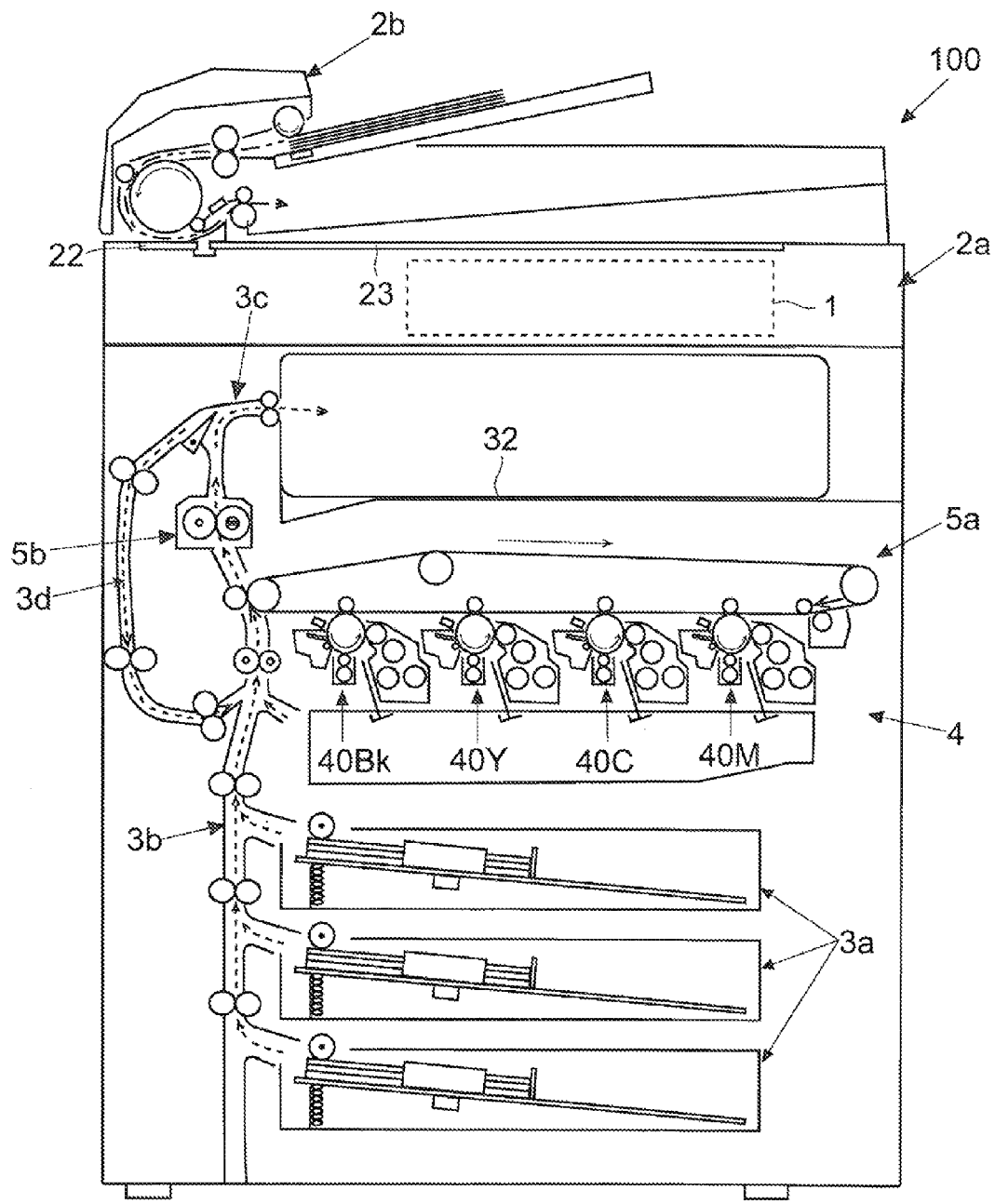
FIG. 1 is a diagram showing a multifunction peripheral according to one embodiment of the present disclosure.

First, with reference to FIG. 1, an outline of the multifunction peripheral 100 according to the embodiment will be described. FIG. 1 is a diagram showing the multifunction peripheral 100.

As shown in FIG. 1, in an upper front part of the multifunction peripheral 100, an operation panel 1 (described in detail later) for making various settings with respect to the multifunction peripheral 100 is provided. Moreover, as shown in FIG. 1, in a top part of the multifunction peripheral 100 according to the embodiment, an image reading section 2a and a document transport section 2b are provided, and inside the multifunction peripheral 100, there are provided a sheet feed section 3a, a transport section 3b, an image formation section 4, an intermediary transfer section 5a, a fusing section 5b, a discharge transport section 3c, a two-side transport section 3d. etc.

The image reading section 2a reads a document and generates image data. The image reading section 2a can also read a document of which the sheets are sequentially transported to the reading position automatically by the document transport section 2b.

With respect to printing, the sheet feed section 3a feeds sheets of a printing medium, one sheet after another, into the transport section 3b. The transport section 3b transports the sheet to a sheet discharge tray 32. The image formation section 4 forms toner images based on the image data. The intermediary transfer section 5a receives primary transfer of toner images of different colors that are generated by image forming units 40 (comprising image forming units 40Bk, 40Y, 40C, and 40M for black, yellow, cyan, and magenta respectively) which are included in the image formation section 4 to form toner images of different colors. The intermediary transfer section 5a then performs secondary transfer to the sheet. The fusing section 5b fuses the toner images transferred to the sheet. After the fusion of the toner, the sheet (printed sheet) is discharged onto the sheet discharge tray 32. The discharge transport section 3c transports the sheet, when discharging the printed sheet, toward the sheet discharge tray 32 and, when performing two-side printing, toward the two-side transport section 3d. In this way, when a copying or printing function is used, image formation (printing) is performed.

The discharge transport section 3c sorts the printed sheet either toward the sheet discharge tray 32 or toward the two-side transport section 3d. The discharge transport section 3c is driven to rotate in the forward direction to feed the sheet toward the sheet discharge tray 32 or, when performing two-side printing, to direct the sheet printed on one side to the two-side transport section 3d. The two-side transport section 3d connects the downstream side of the fusing section 5b to the upstream side of the image formation section 4 to transport the sheet printed on one side.

(Operation Panel 1)

Figure 2:
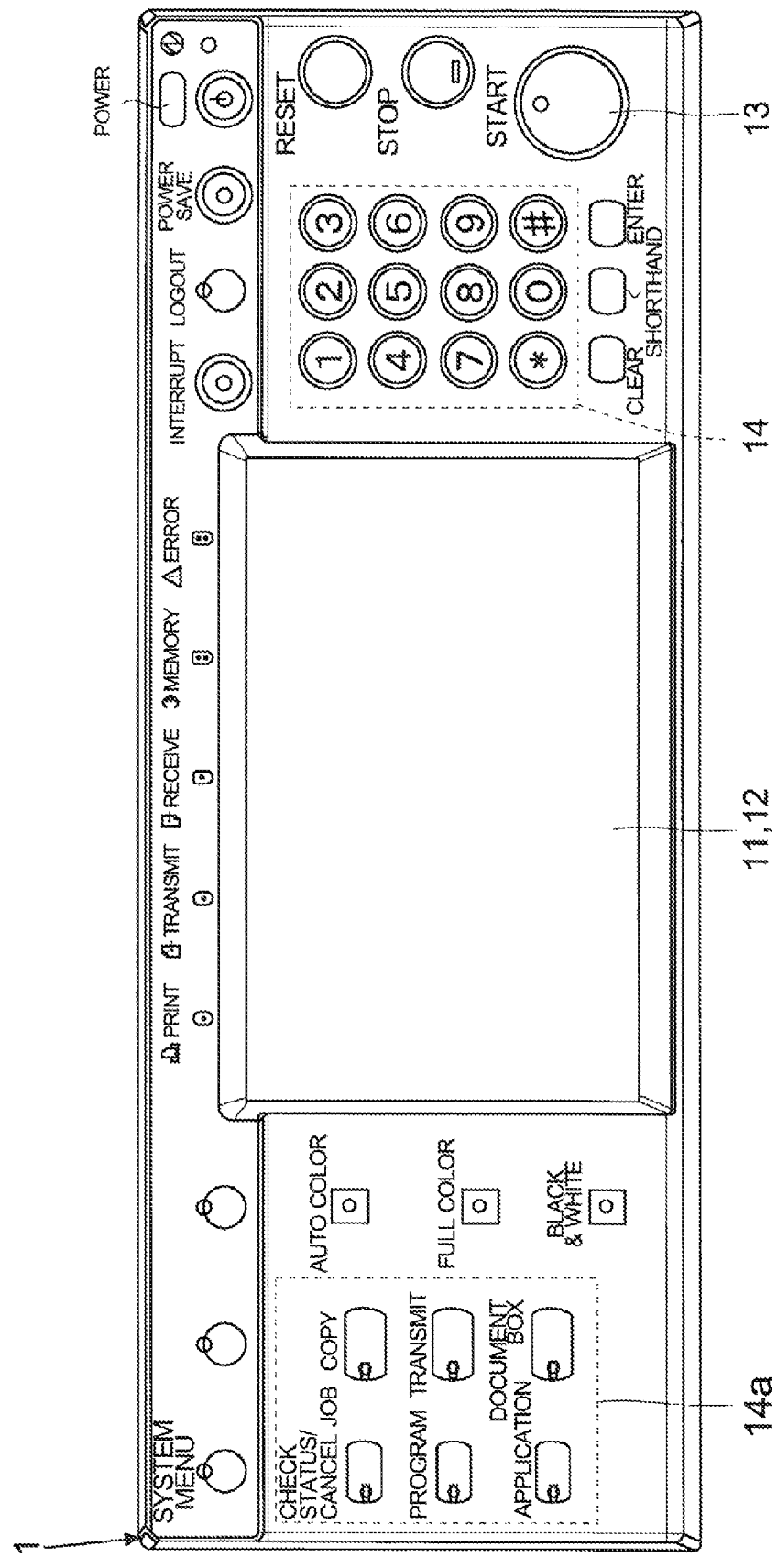
FIG. 2 is a diagram showing an operation panel according to one embodiment of the present disclosure.

Next, with reference to FIG. 2, the operation panel 1 according to the embodiment will be described. FIG. 2 is a diagram showing the operation panel 1.

As shown in FIG. 1, the operation panel 1 is provided in a top front part of the multifunction peripheral 100. As shown in FIG. 2, the operation panel 1 includes a display portion 11, a touch panel portion 12 (corresponding to a registration portion), and various hardware keys. The operation panel 1 includes, as the hardware keys, a START key 13 for requesting the start of a process such as copying, a numerical keypad portion 14 (corresponding to a registration portion) for entry of numerical figures, etc.

The display portion 11 is a liquid crystal display panel (but may instead be any other type of display panel, such as an organic EL panel). The display portion 11 displays screens and images in which menus and keys are arranged for making settings on the multifunction peripheral 100. By specifying keys displayed on the display portion 11, a user can enter various settings for the multifunction peripheral 100. Moreover, the display portion 11 displays various images and screens, such as messages indicating the condition of the multifunction peripheral 100.

Over (on the top face of) the display portion 11, the touch panel portion 12 is provided. The touch panel portion 12 detects the position, that is, coordinates, touched by the user; by comparing the display positions of keys with the touched position, it identifies the key specified by the user and accepts input by the user.

The display portion 11 according to the embodiment displays messages 8. Through input on the operation panel 1, the user can freely create and register notices (messages). A created message 8 can be "attached to" (displayed in) the display region of the display portion 11 (a detailed description will be given later). A message 8 behaves as an image of which the display position can be moved by operations such as a drag-and-drop operation.

On the operation panel 1, a group of function selection keys 14a is provided. By pressing one of the keys among the group of function selection keys 14a, the user selects a desired one of the functions of the multifunction peripheral 100. The group of function selection keys 14a includes a COPY key, which is pressed when a copying function is used, a TRANSMIT key, which is pressed when read image data is transmitted to a computer 200 or a FAX (facsimile) machine 300, etc.

(Hardware Configuration of the Multifunction peripheral 100 etc.)

Figure 3:
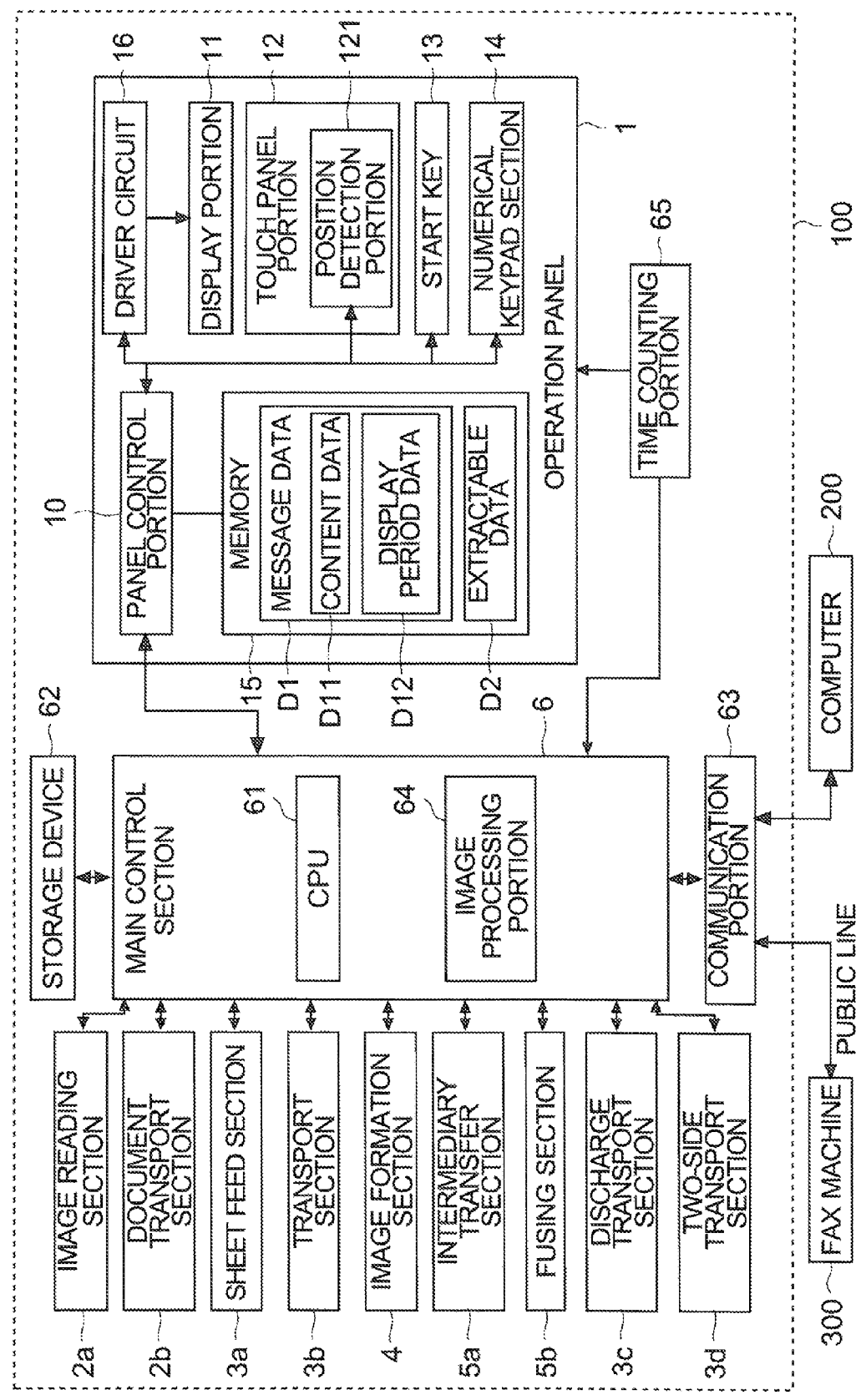
FIG. 3 is a diagram showing a hardware configuration of a multifunction peripheral and an operation panel according to one embodiment of the present disclosure.

Next, with reference to FIG. 3, the hardware configuration of the multifunction peripheral 100 and the operation panel 1 according to the embodiment will be described. FIG. 3 is a diagram showing the hardware configuration of the multifunction peripheral 100 and the operation panel 1.

Inside the main body of the multifunction peripheral 100, a main control section 6 is provided. For example, the main control section 6 is connected to, and controls, the operation panel 1, the document transport section 2b, the image reading section 2a, the sheet feed section 3a, the transport section 3b, the image formation section 4, the fusing section 5b, the discharge transport section 3c, etc.

The main control section 6 includes circuits and devices for control, such as a CPU 61. The CPU 61 performs calculations etc. based on control programs and control data stored in a storage device 62, and controls different parts of the multifunction peripheral 100. The storage device 62 (corresponding to a storage portion) is connected to the main control section 6. The storage device 62 is a combination of nonvolatile and volatile memories, such as a ROM, a RAM, and a HDD. The storage device 62 can store control programs for the multifunction peripheral 100 and different kinds of data such as control data, setting data, and image data.

The main control section 6 is connected to a communication portion 63. The communication portion 63 is connected, across a network, a public line, or the like, to a computer 200 or a FAX machine 300 (for simplicity's sake, only one of each is shown in FIG. 3). The main control section 6 can transmit data to an external computer 200 or to a communication partner's FAX machine (a scanner function and a FAX transmission function). The main control section 6 can also perform printing based on image data that is transmitted from an external computer 200 or from a communication partner's FAX machine to be fed to the multifunction peripheral 100 (a printing function and a FAX reception function).

The main control section 6 is provided with an image processing portion 64 which applies image processing to the image data of a document or the image data fed to the multifunction peripheral 100 via the communication portion 63. The image data processed by the image processing portion 64 is used in printing or transmission, or is stored in the storage device 62.

The main control section 6 also recognizes input made on the operation panel 1, and controls the multifunction peripheral 100 to perform jobs such as copying and scanning according to the settings made by the user. The operation panel 1 according to the embodiment includes a panel control portion 10 (corresponding to a determination portion), a display portion 11, a touch panel portion 12, hardware keys (such as a numerical keypad portion 14 and a START key 13), a memory 15 (corresponding to a storage portion), a driver circuit 16, etc.

The panel control portion 10 includes a CPU, an IC, etc. The panel control portion 10 controls the display on the display portion 11. The panel control portion 10 feeds the driver circuit 16, which actually controls the display on the panel of the display portion 11, with instructions as to what to display. The panel control portion 10 is also fed with the output of the touch panel portion 12 and identifies a touched position (coordinates). The panel control portion 10 compares the touched position with the image data of the screen displayed on the display portion 11 at the time of the touch, and recognizes the key or message 8 displayed at the touched position. Data, such as a table, that indicates the correspondence between the output of the touch panel portion 12 and the position (coordinates) is stored in the memory 15. The memory 15 includes a ROM and a RAM. Thus, the panel control portion 10 can recognize the key specified by the user.

With respect to each message 8 created by a user or an administrator, the memory 15 stores message data D1 containing, among others, content data D11 which indicates the content of the message 8. Based on the message data D1, the panel control portion 10 causes the display portion 11 to display the message 8 (a detailed description will be given later).

The touch panel portion 12 is provided with a position detection portion 121 for detecting a touched position. For example, the position detection portion 121 is an IC for detecting a touched position (the coordinates of the point touched). For example, in a case where the touch panel portion 12 includes a capacitive projected touch panel, the position detection portion 121 detects variation in capacitance to output a signal indicating a touched position or a plurality of simultaneously touched positions. Based on the output of the position detection portion 121, the panel control portion 10 recognizes the touched position or positions.

The multifunction peripheral 100 is further provided with a time counting portion 65. The time counting portion 65 counts time, and functions as a clock. Specifically, the time counting portion 65 counts years, months, days, time (hours, minutes, and seconds), etc. The time counting portion 65 may be provided in the operation panel 1, or may be provided in the main control section 6. Instead, the operation panel 1 (multifunction peripheral 100) may acquire information on date (year, month, day) and time across a network. In that case, the communication portion 63 along with the panel control portion 10 or the main control section 6, which instructs it to acquire information on date and time, functions as the time counting portion 65.

(Creating a Message 8)

Figure 4:
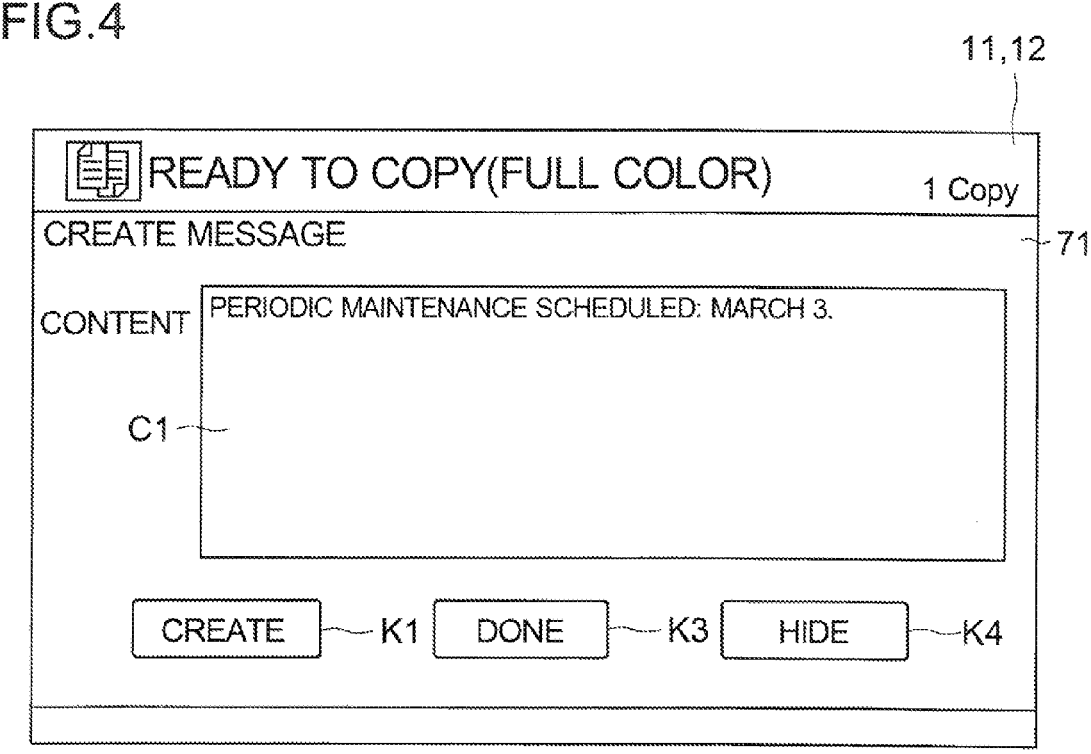
FIG. 4 is a diagram showing a message creation screen according to one embodiment of the present disclosure.
Figure 5:
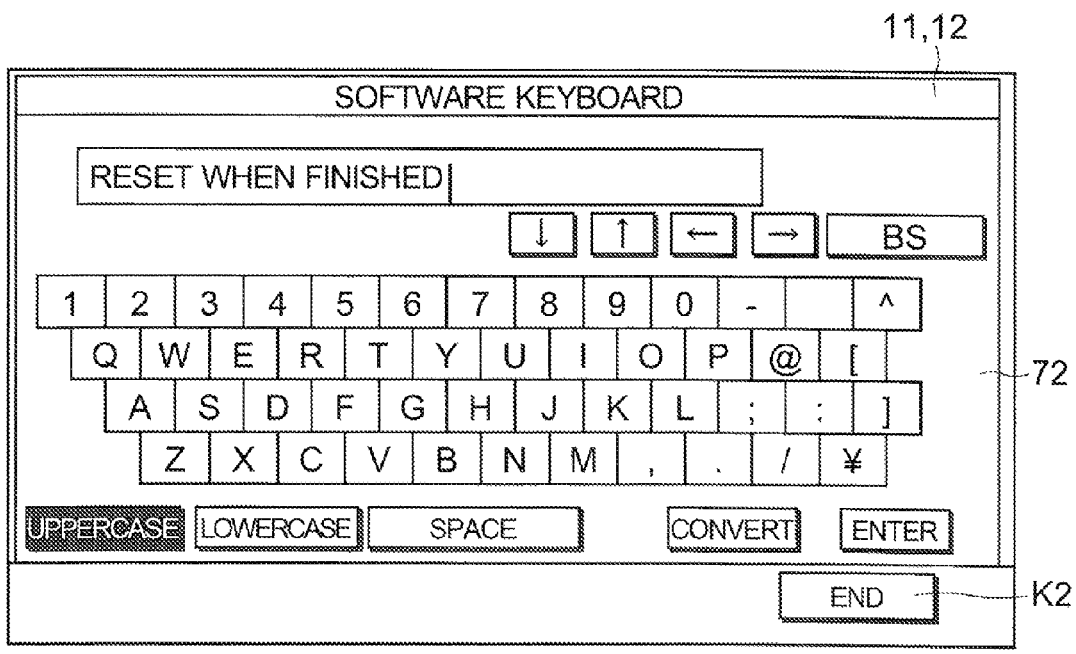
FIG. 5 is a diagram showing a software keyboard screen according to one embodiment of the present disclosure.

Next, with reference to FIGS. 4 and 5, a description will be given of creation of a message 8 according to the embodiment. FIG. 4 is a diagram showing a message creation screen 71. FIG. 5 is a diagram showing a software keyboard screen 72.

The operation panel 1 according to the embodiment stores not only previously prepared fixed messages (information) such as information on errors and conditions but also messages 8 created to convey content freely determined by a user or an administrator, and displays registered messages 8. The following description discusses how a user creates and register a message 8. A message 8 contains text or information, and behaves as an image that is displayed on the display portion 11 and that is "pasted" on a screen.

First, with reference to FIG. 4, a description will be given of creation of a message 8. Through input on the operation panel 1, a user can create information (content, text, information, symbols) to be contained in a message 8. To that end, the operation panel 1 functions as a registration portion which allows entry and registration of a message 8 in the operation panel 1 as by creating the content of the message 8. Instead, the content or the like of a message 8 may be entered on the computer 200 so the multifunction peripheral 100 can receive message data D1 created on the computer 200 to set the message 8. In that case, the communication portion 63 functions as a registration portion for setting the content or the like of a message 8.

The operation panel 1 according to the embodiment provides a message creation screen 71 for creating a message 8. When predetermined operation or input for calling the message creation screen 71 is performed on the touch panel portion 12 or the like, the panel control portion 10 causes the display portion 11 to display the message creation screen 71.

On the message creation screen 71, a CREATE key K1 for creating and inputting the content (such as information or text) to be displayed as a message 8 is provided. When a touch at the display position of the CREATE key K1 is detected, the panel control portion 10 displays the software keyboard screen 72 (see FIG. 5) on the display portion 11. By touching the display positions of relevant keys, the user can create a message 8 using alphabetical letters, symbols, etc. Numerical figures etc. can also be inputted on the numerical keypad portion 14.

When the display position of an END key K2 on the software keyboard screen 72 is touched, the panel control portion 10 closes the software keyboard screen 72 and displays the message creation screen 71. Then the panel control portion 10 displays the message 8 created on the software keyboard screen 72 in a message box C1 on the display portion 11.

When the display position of a DONE key K3 is touched, the panel control portion 10 stores message data D1 containing data indicating the set message 8 and content data indicating the content of the message 8 in the memory 15. In this way, a message 8 created by the user is registered in the operation panel 1. Instead, the message data D1 may be stored in the storage device 62. The user can create more than one message 8 (message data D1); he can register a plurality of different messages in the operation panel 1.

Then, based on the message data D1 stored in the memory 15 or the storage device 62, the panel control portion 10 causes the display portion 11 to display the message 8. When there are a plurality of messages 8 (message data D1) to be displayed, the panel control portion 10 causes the display portion 11 to display the plurality of messages 8.

(Outline of the Display Region for and Display of Messages)

Figure 6:
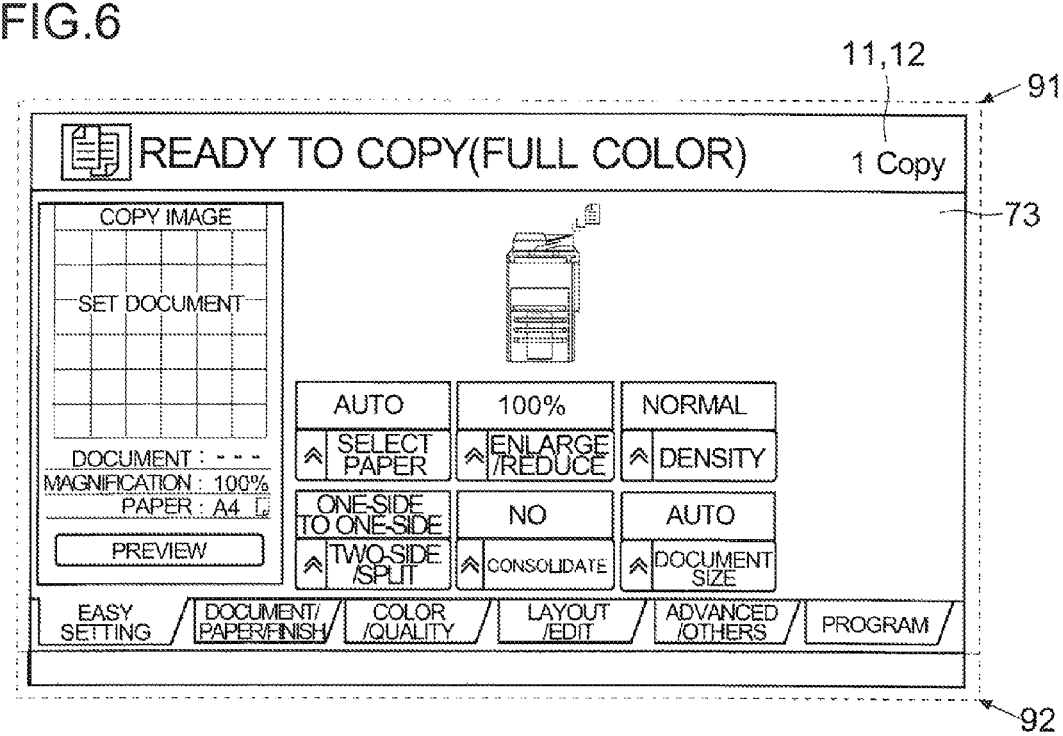
FIG. 6 is a diagram showing an initial setting screen for a copying function according to one embodiment of the present disclosure.
Figure 7:
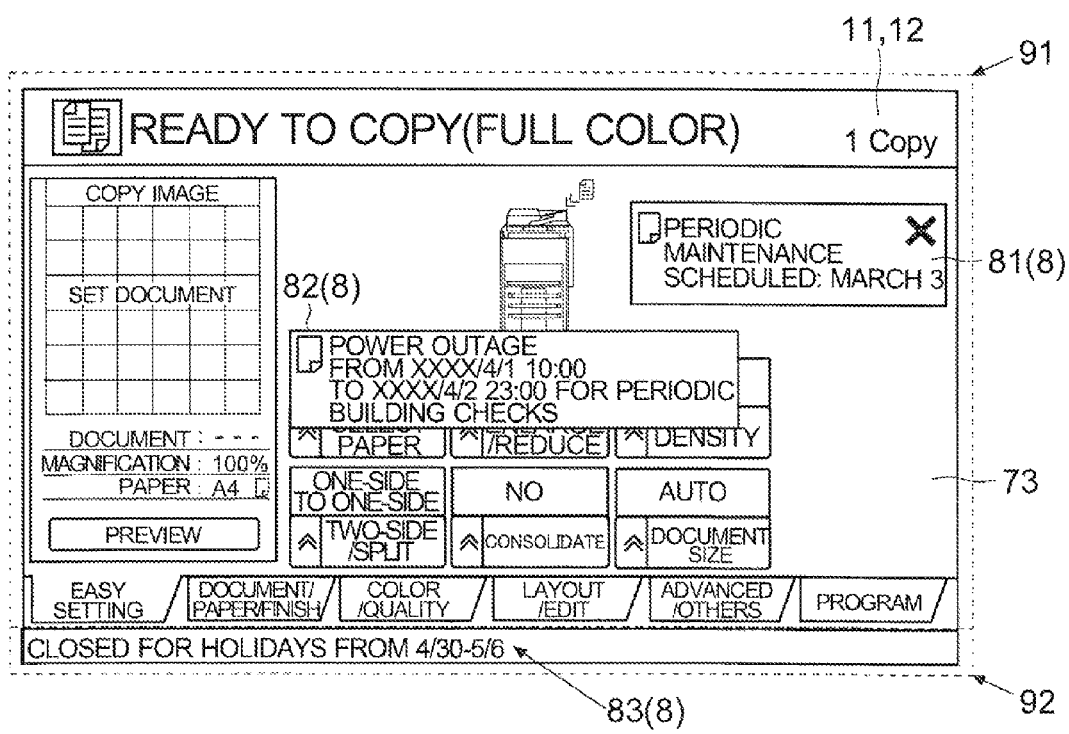
FIG. 7 is a diagram showing an initial setting screen for a copying function, with a message displayed on it, according to one embodiment of the present disclosure.

Next, with reference to FIGS. 6 and 7, an outline description will be given of the display region on the display portion 11 and the display of set messages 8. FIG. 6 is a diagram showing an initial setting screen 73 for the copying function. FIG. 7 is a diagram showing an initial setting screen 73 for the copying function with a message 8 displayed on it.

The multifunction peripheral 100 has a plurality of functions such as copying, printing, and transmitting functions, and for each function, a plurality of setting items are available. Thus, there are a large number of screens that can be displayed on the display portion 11 of the operation panel 1 in accordance with input and operation by the user. For simplicity's sake, therefore, the following description takes, as an example of a screen that is displayed on the display portion 11 of the operation panel 1, the initial setting screen 73 that is displayed first when the copying function is selected.

First, the initial setting screen 73 for the copying function will be described. The initial setting screen 73 for the copying function is the screen that is displayed first when the COPY key among the group of function selection keys 14a is pressed. As shown in FIG. 6, on the initial setting screen 73 for the copying function, keys for setting frequently used setting items are arranged. The user can set for what setting items to show keys on the initial setting screen 73.

On the initial setting screen 73, a plurality of tabs are also arranged. Since there are a large number of setting items as to the copying function, not all the setting items can be shown on a single screen. Accordingly, the setting items related to the copying function are classified into one of a plurality of categories (groups). The tabs are labeled with categories (such as document, paper, finish, and color/image quality) of setting items for the copying function. When the display position of a tab other than an EASY SETTING tab is touched, the operation panel 1 causes the display portion 11 to display a screen for selection of setting items allocated to the corresponding category. Then, the user touches the display position of a relevant tab to select a desired setting item, and can set a set value for the selected setting item.

First, with reference to FIGS. 6 and 7, the display region of a message 8 will be described.

As described above, on the operation panel 1 according to the embodiment, the user creates and sets a message 8 that he wants to display, and the panel control portion 10 causes the display portion 11 to display the set message 8. Then, on the operation panel 1 according to the embodiment, as a region in which to display messages 8, a main region 91 and a sub region 92 are provided.

The main region 91 is a region that occupies the greater part of the display portion 11, and in the main region 91, various setting screens are also displayed. On the operation panel 1 according to the embodiment, when a message 8 is displayed in the main region 91, the panel control portion 10 causes the display portion 11 to display it in the form of an electronic sticky note. That is, as shown in FIG. 7, when displaying a message 8 in the main region 91, the panel control portion 10 displays it on the display portion 11 such that the message 8 (like a sticky note) lies over the various setting screens. In other words, when displaying a message 8 in the main region 91, the panel control portion 10 causes the display portion 11 to display the message 8 as an upper layer over a setting screen.

On the other hand, the sub region 92 is a region narrower than the main region 91 (one-severalth to one-ten-and-severalth as large as it). Accordingly, the panel control portion 10 causes the display portion 11 to display a message 8 there not in the form of an electronic sticky note but in the form of text in one line. Since the sub region 92 is narrower than the main region 91, the panel control portion 10 causes the display portion lithe display the message 8 with a display size smaller than in the main region 91.

Specifically, on the operation panel 1 according to the embodiment, the sub region 92 is provided in a bottom end part of the display portion 11. In the embodiment, assuming that the right/left direction of the display portion 11 is its longer-side direction, the sub region 92 is an elongate rectangular region provided at the bottom end of the display portion 11. The sub region 92 is a region to which part of the display region of the display portion 11 is allotted. The panel control portion 10 causes a message 8 to be displayed in the sub region 92 on the display portion 11.

Next, the display of messages 8 will be described in outline. The panel control portion 10 checks the message data D1 of different messages 8 stored in the memory 15 or the storage device 62. Then, based on the message data D1, the panel control portion 10 causes the display portion 11 to display one or more messages 8 on various setting screens (see FIG. 7). FIG. 7 shows an example where, as messages 8, the following three messages are displayed: "Periodic Maintenance Scheduled: March 3" (hereinafter referred to as the first message 81 for convenience' sake); "Power Outage from xxxx/4/1 10:00 to xxxx/4/2 23:00 for Periodic Building Checks" (hereinafter referred to as the second message 82 for convenience' sake); "Closed for Holidays from 4/30-5/6" (hereinafter referred to as the third message 83 for convenience' sake).

On the operation panel 1 according to the embodiment, a message 8 displayed in the form of an electronic sticky note in the main region 91 can be moved to be displayed in the sub region 92. A message 8 displayed in the sub region 92 can also be moved to be displayed in the form of an electronic sticky note in the main region 91. In other words, the panel control portion 10 changes the region where a message 8 is displayed, and changes the manner how a message 8 is displayed on the display portion 11.

When, based on the output of the touch panel portion 12, the panel control portion 10 recognizes that a movement operation has been made to move a message 8 displayed in the main region 91 to the sub region 92 to display it there, the panel control portion 10 causes the message 8 for which the movement operation has been made to be displayed in the sub region 92 and thereby changes its display position. When, based on the output of the touch panel portion 12, the panel control portion 10 recognizes that a return operation has been made to move a message 8 displayed in the sub region 92 to the main region 91 to display it there, the panel control portion 10 causes the message 8 for which the return operation has been made to be displayed in the form of an electronic sticky note in the main region 91 and thereby changes its display position. Specifically, on the operation panel 1 according to the embodiment, a drag-and-drop operation is accepted as a movement operation and as a return operation (any other operation may instead be accepted as such). In this way by a drag-and-drop operation, the display region and the display position of a message 8 can be changed.

Incidentally, when there are a plurality of messages 8 that are to be displayed in the sub region 92, the panel control portion 10 cyclically switches those messages 8 from one to the next at predetermined time intervals (for example, at intervals of several seconds).

(Editing a Message 8)

The operation panel 1 may accept operations and settings for the editing of the content of a message 8 displayed. A description will now be given of the editing of a message 8 created by the user.

When a predetermined operation for editing a displayed message 8 is made, such as a plurality of touches on the displayed position within a previously determined period of time, the panel control portion 10 causes the display portion 11 to display the message creation screen 71 corresponding to the message 8 that is the target of editing. At this time, the panel control portion 10 causes the display portion 11 to display the message creation screen 71 with the message 8 that is the target of editing displayed in a message display box C1.

The user can modify the message 8 that is the target of editing. When the display position of the CREATE key K1 on the message creation screen 71 of the message 8 to be edited, the panel control portion 10 causes the display portion 11 to display the software keyboard screen 72. Then, the panel control portion 10 causes the message data D1 in the memory 15 or the storage device 62 to be refreshed with message data D1 reflecting the content modified on the software keyboard screen 72. In this way, the panel control portion 10 causes the display portion 11 to display the message 8 with the revised content thereafter.

The user can also keep a message 8 that is the target of editing hidden (undisplayed) thereafter. When the display position of a HIDE key K4 on the message creation screen 71 is touched to hide the message 8, the panel control portion 10 in principle prevents the display portion 11 from displaying the message 8 (electronic sticky note) that is instructed to be hidden.

When a message 8 is set to be in principle hidden with the HIDE key K4, then in place of the HIDE key K4, a SHOW key (unillustrated) is displayed. By touching the display position of the SHOW key, the user can set the message 8 that is set to be hidden to be displayed thereafter. When the display position of the SHOW key on the message creation screen 71 is touched to cancel the hiding of the message 8, the panel control portion 10 causes the display portion 11 to display the message 8 (electronic sticky note) of which the hiding is now canceled until an end date.

(Setting a Start Time of an Event and an End Time of Display of a Message 8)

Figure 8:
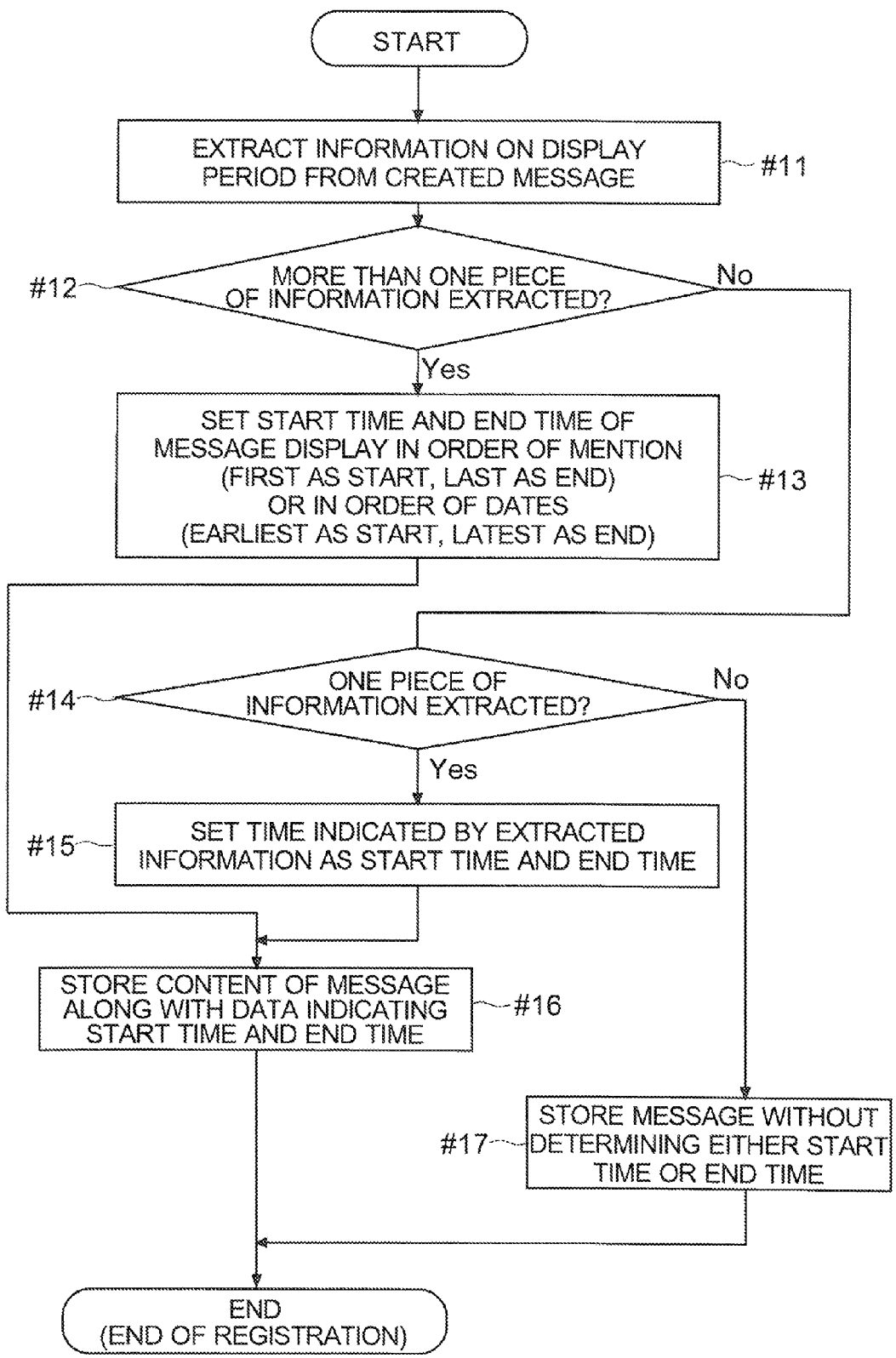
FIG. 8 is a flow chart showing a flow for setting a start time and an end time of a message according to one embodiment of the present disclosure.

Next, with reference to FIG. 8, a description will be given of a flow for setting a start time of an event and an end time of display of a message 8 which is gone through when a message 8 is registered on the operation panel 1 according to the embodiment. FIG. 8 is a flow chart showing a flow for setting a start time and an end time of a message 8.

On the operation panel 1 according to the embodiment, from a message 8 created and registered by the user, information on the display period of the message 8 is extracted. Then, based on the extracted information, an end time of display of the message 8 and a start time of the event announced by the message 8 are set. This eliminates the need to make detailed settings as to the display period of a message 8 as conventionally required. Moreover, a display period can be defined in a form contained in a message 8.

Now, with reference to FIG. 8, a description will be given of the extraction of information on a display period from a message 8 and the setting of an end time and a start time. The flow in FIG. 8 is started when a message 8 is registered (when, after a message 8 is created on the message creation screen 71, the display position of the DONE key K3 is touched for registration).

First, the panel control portion 10 extracts information on a display period from a created message 8. Specifically, the panel control portion 10 extracts a series of symbols and characters indicating a date or a time. What symbols or characters to extract as information on a display period is defined in the memory 15.

In the memory 15, there are defined combinations of characters, symbols, and numerals that are to be extracted as information on a display period on the basis of formats that are conventionally used to notate dates and times, such as "year n," "month n" (which may instead be one of "January" to "December" and their abbreviations), "day n," "n hours, "n minutes," "n seconds," "n/m," "n:nn am, and "n:nn pm." These combinations are stored as extractable data D2 in the memory 15 (see FIG. 3).

With a view to keeping the size of the extractable data D2 small, and to extract information on a display period accurately, on the operation panel 1 according to the embodiment, formats for notating information on display periods are previously determined to a certain extent. For example, it is determined that a date is notated in the format "n (month)/m (day)" or "month n/day m," and that a year-month-day is notated in the format "a (year)/b (month)/c (day)." Thus, when the user creates a message 8 to contain a display period in a determined format, the message (electronic sticky note) is kept displayed for a desired period of time (its display period can be controlled).

When information indicating a year-month-day-time is given in a concatenated form (that is, notated with no intervention by information not indicating a time, with any space ignored), the panel control portion 10 extracts the set of information in a concatenated form as information on a single display period. For example, when a message 8 contains a notation "year n, month n, day n," the panel control portion 10 does not break it down to a year, a month, and a day to take each as information of a display period, but extracts the entire notation "year n, month n, day n" as information on a single display period. When extracted information on a single display period contains no year but indicates a date, the panel control portion 10 takes it as indicating a date with one year of the current date.

Referring to the extractable data D2, the panel control portion 10 extracts information on a display period from a message 8 created and about to be registered (step #11). For example, from the first message 81 "Periodic Maintenance Scheduled: March 3," the panel control portion 10 extracts "March 3" as information on a display period. Likewise, from the second message 82 "Power Outage from xxxx4/1 10:00 to xxxx/4/2 23:00 for Periodic Building Checks," the panel control portion 10 extracts "xxxx/4/1 10:00" and "xxxx/4/2 23:00" as information on a display period. Likewise, from third message 83 "Closed for Holidays from 4/30-5/6," the panel control portion 10 extracts "4/30" and "5/6" as information on a display period.

Then, a determination portion (the panel control portion 10) checks whether or not a plurality of pieces of information on display periods have been extracted (step #12). When a plurality of pieces of such information have been extracted (step #12, "Yes"), the panel control portion 10 takes and sets the set of information (the time it indicates) extracted first starting with the head of the message 8 as a start time, and takes and sets the set of information (the time it indicates) extracted last starting with the head of the message 8 as an end time (setting according to the order of mention; step #13). In this case, according to the determining principle that a start time and an end time are determined in the order of position in the message 8, the user creates the message 8 containing information indicating a display period. Instead, the panel control portion 10 may take and set, of a plurality of character strings, the set of information (the time it indicates) indicating the earliest date and time as a start time and the set of information (the time it indicates) indicating the latest date and time as an end time (setting according to the order of dates; step #13). In this case, the user creates the message 8 containing information indicating a start time and an end time. According to either principle, the user can accurately define, in a message 8, the end time of the message 8 and the start time of an event.

On the operation panel 1 according to the embodiment, the user can choose between setting a start time and an end time according to the order of mention and setting them according to the order of dates, and can make the choice through input on the operation panel 1.

On the other hand, when a plurality of pieces of information have not been extracted (step #12, "No"), then the panel control portion 10 checks whether or not a single piece of information on a display period has been extracted (step #14). When a single piece of information on a display period has been extracted (step #14, "Yes"), the determination portion (the panel control portion 10) takes and sets the time indicated by the extracted information as a start time and an end time (step #15). In this way, the message 8 is displayed for the date and time indicated by the information. Thus, based on the content of a message 8, the display period of the message 8 is determined, and the content of the message 8 can effectively be announced to the user.

Then, the panel control portion 10 causes the memory 15 or the storage device 62 to store, as message data D1, content data D11 indicating the content of the message 8 along with display period data D12 indicating the determined and set end time and start time (see FIG. 3) (from step #16 to the end of the flow). In this way, along with the content of a message 8 created by the user, data indicating its display period is automatically registered.

When no piece of information on a display period has been extracted (step #14, "No"), the panel control portion 10 causes the memory 15 or the storage device 62 to store only content data D11 as message data D1 without determining either an end time or a start time of the created message 8 (without adding display period data D12) (from step #17 to the end of the flow).

(Displaying a Message Based on a Start Time or an End Time)

Figure 9:
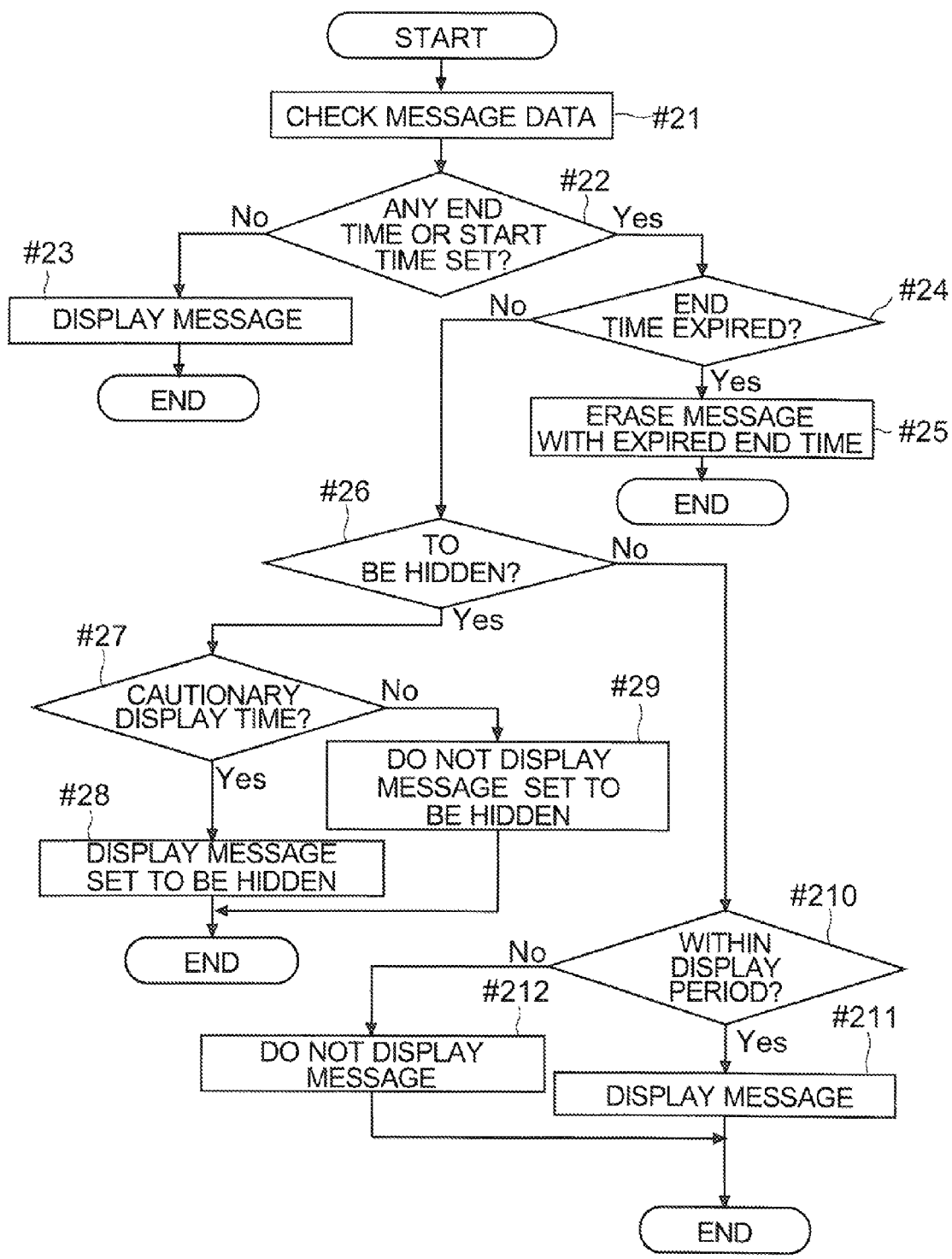
FIG. 9 is a flow chart showing a flow for controlling display of a message according to one embodiment of the present disclosure.

Next, with reference to FIG. 9, a description will be given of the control of display of a message 8 based on an end time or a start time according to the embodiment. FIG. 9 is a flow chart showing a flow for controlling display of a message 8 based on an end time or a start time.

For example, the flow in FIG. 9 is started when display on the operation panel 1 is started. Display on the operation panel 1 starts when the main power is switched on, or a power save mode is canceled. The flow in FIG. 9 may also be exacted, with the main power on and outside a power save mode, while the display portion 11 of the operation panel 1 (multifunction peripheral 100) is displaying, periodically or cyclically (for example, every 10 minutes or every one or several hours).

In a case where there are a plurality of messages that are to be displayed on the display portion 11 (in a case where message data D1 corresponding to a plurality of messages are stored in the memory 15 or the storage device 62), the flow in FIG. 9 is executed (repeated) with respect to each message. In other words, the flow chart in FIG. 9 is for dealing with a single message 8.

First, the panel control portion 10 checks the message data D1 stored in the memory 15 or the storage device 62 (step #21). Then, the panel control portion 10 checks whether or not an end time of display or a start time of an even is set with respect to a message 8 (whether or not display period data D12 is added to the checked message 8) (step #22).

If no end time or start time is set (step #22, "No"), based on the content data D11 contained in the checked message data D1, the panel control portion 10 causes the message 8 to be displayed (from step #23 to the end of the flow). In this way, a message 8 for which no end time or start time is set is, when the display portion 11 displays, displayed all the time. That is, when no piece of information can be extracted from a message 8, the determination portion (panel control portion 10) does not set either a start time or an end time, and the display portion 11 causes a message for which no start time or end time is set to be displayed. In this way, by preparing a message 8 such that it contains no date or time, it is possible to display the message 8 all the time. It is also possible not to display a message 8 for which no end time or start time is set.

On the other hand, when an end time or a start time is set (step #22, "Yes"), referring to the time counted by the time counting portion 65, the panel control portion 10 checks whether or not the end time has already expired (step #24).

If the end time has already expired (step #24, "Yes"), the panel control portion 10 causes the message data D1 of the message 8 of which the end time has expired to be erased from the memory 15 (from step #24 to the end of the flow). That is, the storage portion (the memory 15 or the storage device 62) erases a message 8 of which the end time has expired, and the display portion 11 does not display a message of which the end time has expired. In this way, a message 8 that has become unnecessary due to its display period having expired automatically ceases to be displayed. Thus, the user does not need to perform operations to erase or delete messages that have become unnecessary. Moreover, unnecessary data is automatically deleted from the storage portion, and this permits effective use of the storage region in the storage portion.

Specifically, the panel control portion 10 erases the content data D11 and the display period data D12 of a message 8 of which the end time has expired. Thereby, the panel control portion 10 prevents a message 8 of which the end time has expired from being displayed on the display portion 11. In other words, the panel control portion 10 displays a message 8 for which an end time is set until the end time.

On the other hand, when the end time has not yet expired (step #24, "No"), the panel control portion 10 checks whether or not the message 8 is set to be hidden (step #26). As previously described with reference to FIG. 4, by touching the display position of the HIDE key K4 on the message creation screen 71, it is possible to set a message 8 to be hidden (see FIG. 4).

When, the message 8 is set to be hidden with a touch at the display position of the HIDE key K4 (step #26, "Yes"), the panel control portion 10 checks whether or not the current time is a cautionary display time which is previously determined as a time at which to force a message 8 that is set to be hidden to be displayed (step #27).

A cautionary display time is a time point at which to force a message 8 that is set to be hidden to be displayed. A cautionary display time is a time point a predetermined period of time earlier than the start time of an event announced by a message 8 or the end time of display of a message 8, and is a time point that can be determined arbitrarily. A cautionary display time may be determined with reference to an end time, or may be determined with reference to a start time, or may be determined with reference to both an end time and a start time. When a message 8 is set to be hidden, the message 8 that is set to be hidden does not need to be displayed frequently. Accordingly, a cautionary display time may be, for example, one of the very day on which the end time or the start time falls and the day a week before the end time or the start time. In this way, a cautionary display time is set to give a shorter display time than a message 8 that is not set to be hidden (an ordinary message 8).

If the current time is the cautionary display time (step #27, "Yes"), the panel control portion 10 causes the display portion 11 to display the message 8 that is set to be hidden (from step #28 to the end of the flow). In other words, the registration portion (the touch panel portion 12, the numerical keypad portion 14, the communication portion 63, etc.) accepts input of a setting to hide a message 8 stored in the storage portion (the memory 15 and the storage device 62), and the display portion 11 displays the message 8 for which the setting to hide has been inputted at the previously determined cautionary display time which is earlier than one or both of the end time and the start time. In this way, it is possible to force a message 8 that has once been set to be hidden to be displayed, to raise awareness, before the end date (end time) and the start date (start time). By contrast, when the current time is not the cautionary display time (step #27, "No"), the panel control portion 10 prevents the display portion 11 from displaying the message 8 that is set to be hidden (from step #29 to the end of flow).

On the other hand, when, at step #26, the message 8 is not one that is set to be hidden (step #26, "No"), the panel control portion 10 checks whether or not the current time falls within the period in which to display the message 8 (step #210).

To enable determination of whether or not to display the message 8 here, a due display duration is previously determined. A due display duration is a period that can be determined arbitrarily. A due display duration is a given period such as one week, several weeks, one month, a few days (two or three days). It is also possible to allow the due display duration to be set through input on the touch panel portion 12 and the numerical keypad portion 14. In other words, the "previously determined due display duration" is a time that can be determined arbitrarily. It is a period (such as one day, a few days, or one week) that is considered necessary to make the content of the message 8 known to the people involved.

When the time point earlier than the start time by the due display duration has already expired, the panel control portion 10 determines that the current time falls within the period in which to display the message 8 (step #210, "Yes"). In other words, when the time point earlier than the start time (of an event) by the previously determined due display duration has expired, the panel control portion 10 causes the display portion 11 to start displaying the message 8. By contrast, when the current time falls before the time point earlier than the start time by the due display duration, the panel control portion 10 determines that it is still too early to start displaying the message 8 and that the current time is outside the period in which to display the message 8.

When the current time falls within the period in which to display the message 8 (step #210, "Yes"), the panel control portion 10 causes the display portion 11 to display the message 8 (from step #211 to the end of flow). That is, the determination portion (panel control portion 10) extracts, from the content of a message 8, information on the display period of the message 8, and based on the extracted information determines the start time of the event indicated by the content of the message 8; when the time point earlier than the start time by a previously determined due display duration expires, the display portion 11 starts displaying the message 8. In this way, from the content of a message 8, information on a display period (the start time of an event) is automatically extracted, and based on the extracted information, the display of the message 8 can be started at a proper time point. Thus, the display of the message 8 can be started at an effective time point. Conventionally, when the user sets a wrong display period for a message 8, the display of the message 8 is started at an improper timing; instead of all this, the display of a message 8 can be started automatically with proper timing. Moreover, the user does not need to set the time point at which to start the display of a message 8, and this helps simplify the operation for registration. Since a message 8 starts to be displayed at the time point earlier than the start date of an event by a due display duration, the message 8 is prevented from being kept displayed longer than necessary. A message 8 never remains occupying the display region of the display portion 11 for a long period, and therefore the display region of the display portion 11 can be used effectively.

By contrast, when the current time does not fall within the period to display the message 8 (step #210, "No"), the panel control portion 10 prevents the display portion 11 from displaying the message 8 (from step #212 to the end of flow).

As described above, a display device (operation panel 1) according to the embodiment includes a registration portion (a touch panel portion 12, a numerical keypad portion 14, a communication portion 63, etc.) which accepts input of a message 8 created by a user, a storage portion (a memory 15 or a storage device 62) which stores the message 8 inputted via the registration portion, a determination portion (a panel control portion 10) which extracts information on a display period of the message 8 from the content of the message 8 and which determines, based on the extracted information, an end time of display of the message, a time counting portion 65 which counts time, and a display portion 11 which displays the message 8 stored in the storage portion until the end time determined by the determination portion.

Thus, from the content of the message 8, information (an end time) on the display period is automatically extracted, and based on the extracted information, the message 8 can be displayed during a proper period (a period in which it needs to be announced). This makes it possible to effectively announce the message 8 to users. Moreover, conventionally, when a user sets a wrong display period for the message 8, the message 8 cannot be displayed with proper timing; instead of all this, the message 8 is displayed with its end time automatically determined, and thus the message 8 can be displayed with proper timing without losing the period in which to display the message 8. Moreover, the user does not need to make settings as to the display period of the message 8 (such as an end time point of its display), and this helps simplify operations for creating and registering the message 8.

Moreover, an image forming apparatus (multifunction peripheral 100) includes a display device (operation panel 1) that does not require setting of a display period and that permits simplified operations for creation and registration of messages 8, and this makes it possible to provide an image forming apparatus that allows easy display of messages 8. Moreover, the inclusion of the display device described above makes it possible to provide an image forming apparatus that displays messages 8 with proper timing to realize effective announcement.

An embodiment of the present disclosure has been described above. The scope of the present disclosure, however, is not limited by the embodiment. The present disclosure may be implemented with any modifications made without departing from its spirit.

The present disclosure finds applications in display devices and image forming apparatuses having a display portion, such as an operation panel, and a touch panel portion.

The above description of the embodiment of the present disclosure may be grasped as disclosing methods as well.

What is claimed is:

1. A display device comprising:
   a registration portion which accepts input of text created by a user to be included in an electronic sticky note, the text containing a notation indicating a date and time;
   a storage portion which stores the electronic sticky note registered as a result of the registration portion accepting the input, along with extractable data in which are defined combinations of characters, symbols, and numerals that are to be extracted as information on a display period on a basis of the notation;

a determination portion which, by referring to the extractable data, automatically extracts information on a display period of the electronic sticky note from content of the text of the electronic sticky note about to be created and registered and which determines, based on the extracted information, an end time of display of the electronic sticky note;

a time counting portion which counts time;

a display portion which displays the electronic sticky note stored in the storage portion and including the text containing the notation such that the electronic sticky note lies over a setting screen until the end time determined by the determination portion, the registration portion accepts input of a setting to hide the electronic sticky note stored in the storage portion, the determination portion, by referring to the extractable data, automatically extracts the information on the display period of the electronic sticky note from the content of the text of the electronic sticky note itself about to be created and registered, and determines, based on the extracted information, a start time of an event indicated by the content of the text of the electronic sticky note, and the display portion, on one hand, displays the electronic sticky note that is set to be hidden at a previously determined cautionary display time which is earlier than one or both of the end time and the start time and, on the other hand, displays the electronic sticky note that is not set to be hidden when a time point earlier than the start time of the event by a previously determined due display duration expires.

2. The display device according to claim 1, wherein
when the determination portion can extract one piece of the information from the text of electronic sticky note, the determination portion determines that the information is the start time and the end time.

3. The display device according to claim 1, wherein
when the determination portion can extract a plurality of pieces of the information from the text of the electronic sticky note, the determination portion determines that a piece of the information extracted first starting with a head of the text of the electronic sticky note is the start time and that a piece of the information extracted last starting with the head of the message is the end time.

4. The display device according to claim 1, wherein
when the determination portion can extract a plurality of pieces of the information from the text of the electronic sticky note, the determination portion determines that, of the plurality of pieces of the information, a piece of the information with an earliest date and time is the start time and a piece of the information with a latest date and time is the end time.

5. The display device according to claim 1, wherein
the storage portion erases the electronic sticky note when the end time expires, and
the display portion does not display the electronic sticky note when the end time expires.

6. The display device according to claim 1, wherein
when the determination portion can extract no piece of the information from the electronic sticky note, the determination portion determines neither the start time nor the end time, and
the display portion displays the electronic sticky note with no start time or end time determined.

7. An image forming apparatus comprising a display device according to claim 1.

8. A method of controlling a display device, comprising the steps of:
accepting input of text created by a user to be included in an electronic sticky note, the text containing a notation indicating a date and time;
storing the electronic sticky note with extractable data in which are defined combinations of characters, symbols, and numerals that are extractable as information during a display period based on the notation;
extracting, automatically based on the extracted data, information on a display period of the electronic sticky note from content of the text of the electronic sticky note, the electronic sticky note itself about to created and registered;
determining, based on the extracted information, an end time of display of the electronic sticky note;
counting time;
displaying the stored electronic sticky note until the determined end time;
accepting input of a setting to hide the electronic sticky note stored;
exacting, by referring to the extractable data, and automatically extracting the information on the display period of the electronic sticky note from the content of the text of the electronic sticky note itself about to be created and registered;
determining, based on the extracted information, a start time of an event indicated by the content of the text of the electronic sticky note;
displaying the electronic sticky note that is set to be hidden at a previously determined cautionary display time which is earlier than one or both of the end time and the start time; and
displaying the electronic sticky note that is not set to be hidden when a time point earlier than the start time of the event by a previously determined due display duration expires.

9. The method of controlling a display device according to claim 8, comprising,
when one piece of the information can be extracted from the text of the electronic sticky note, determining that the information is the start time and the end time.

10. The method of controlling a display device according to claim 8, comprising,
when a plurality of pieces of the information can be extracted from the text of the electronic sticky note, determining that a piece of the information extracted first starting with a head of the text of the electronic sticky note is the start time and that a piece of the information extracted last starting with the head of the electronic sticky note is the end time.

11. The method of controlling a display device according to claim 8, comprising,
when a plurality of pieces of the information can be extracted from the text of the electronic sticky note, determining that, of the plurality of pieces of the information, a piece of the information with an earliest date and time is the start time and a piece of the information with a latest date and time is the end time.

12. The method of controlling a display device according to claim 8, comprising:
erasing the electronic sticky note when the end time expires; and
not displaying the electronic sticky note when the end time expires.

13. The method of controlling a display device according to claim 8, comprising:
- when no piece of the information can be extracted from the text of the electronic sticky note, determining neither the start time nor the end time; and
- displaying the electronic sticky note with no start time or end time determined.

\* \* \* \* \*